United States Patent Office 3,574,587
Patented Apr. 13, 1971

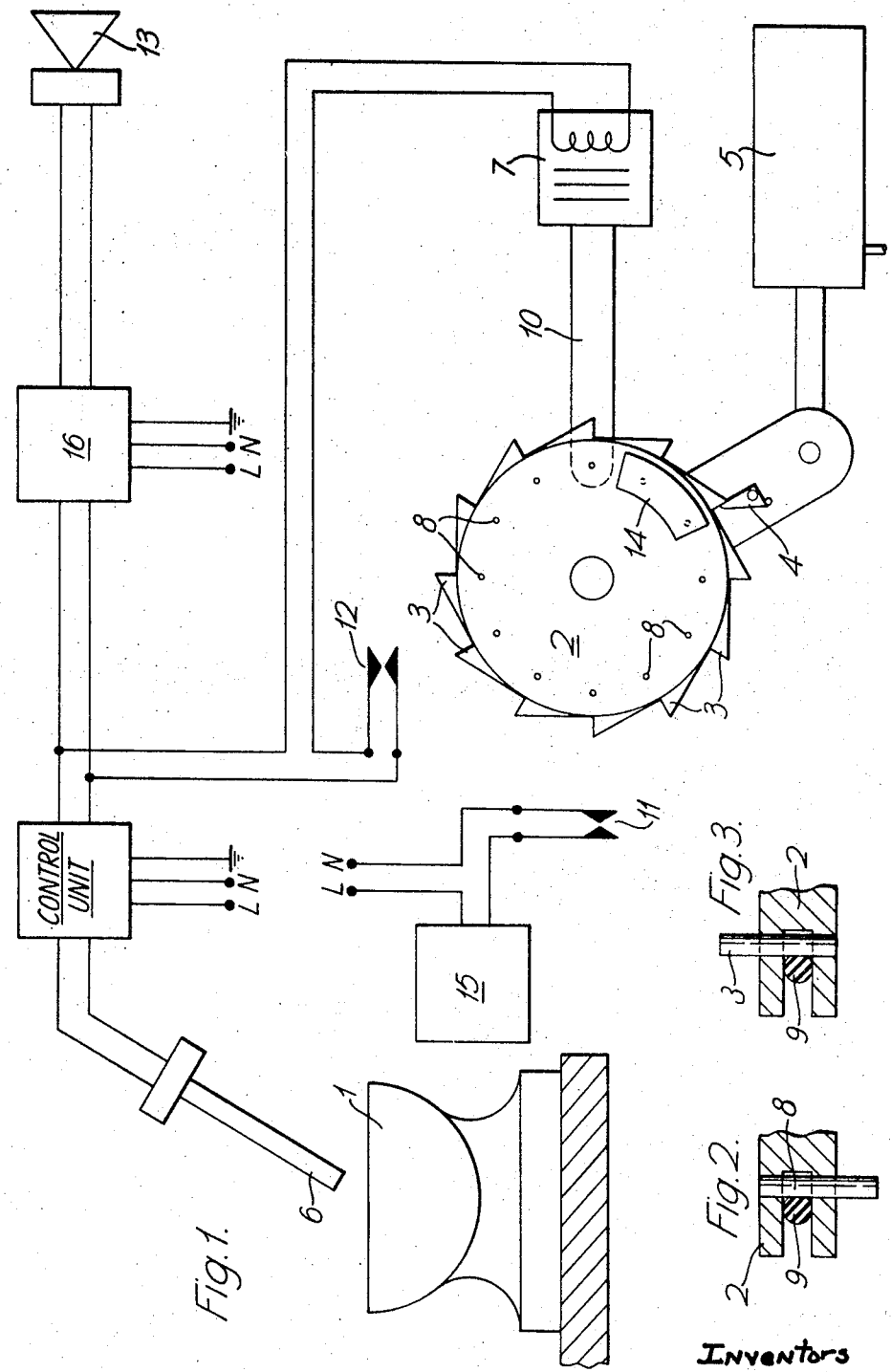

3,574,587
GLASS FORMING MACHINE
Cyril Grundy, St. Helens, and John Bradley Stow, Ormskirk, England, assignors to Ravenhead Glass Limited, St. Helens, England
Filed Nov. 12, 1968, Ser. No. 775,020
Claims priority, application Great Britain, Nov. 15, 1967, 52,001/67
Int. Cl. G08b 21/00; C03b 9/00, 11/02
U.S. Cl. 65—158                                10 Claims

ABSTRACT OF THE DISCLOSURE

A machine for forming hollow glass articles which comprises a rotating turret carrying a plurality of molds, a charging chute for filling the molds with molten glass, a plunger or blowpipe for forming the charge into a shape, and a push rod for ejecting the formed glass from the molds. A control unit is indexable intermittently into a plurality of positions equal to the number of molds. The unit comprises a plurality of pins which are mounted in a ratchet wheel. Each pin corresponds to a specific mold and is moved into operative position by contact with a lever attached to a solenoid. The solenoid is coupled to an infrared detector head which is situated between the removal station and charging station, and which determines the presence of a filled mold and passes a signal to the solenoid, which through the lever actuates the pin. The pin in its operative position then contacts a switch which causes either the mold charger or article former not to operate in conjunction with the filled mold.

---

Figure 4:
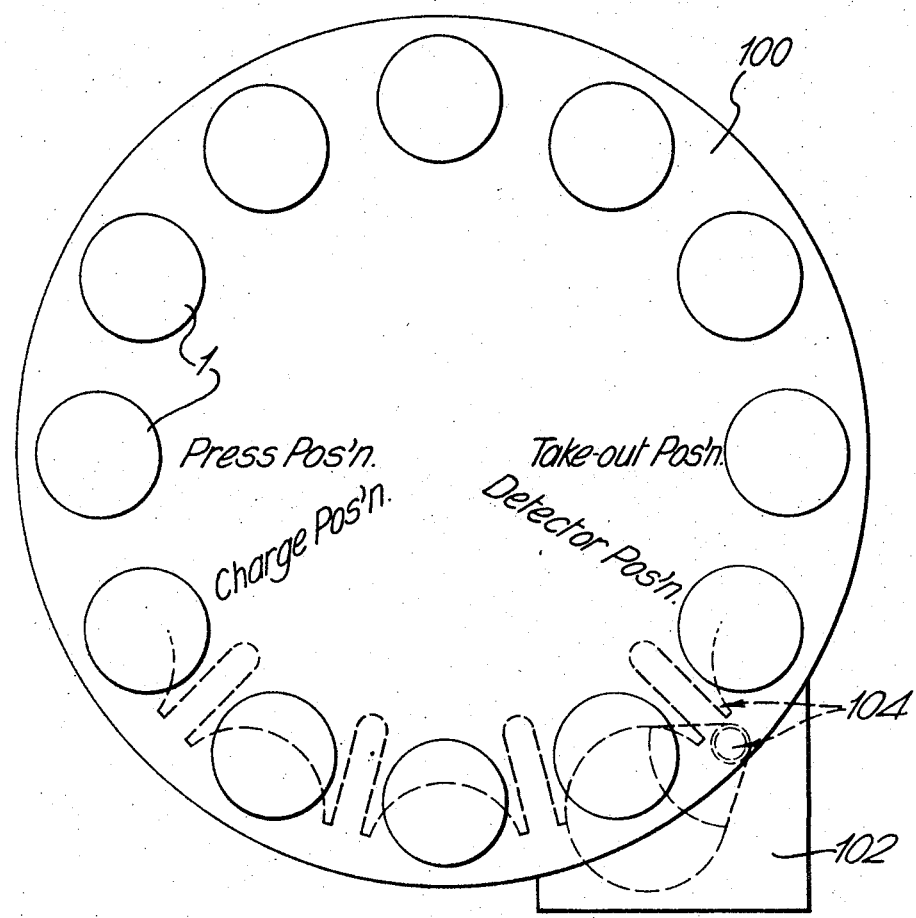

This invention relates to glass forming machines, and especially relates to automatic machines for moulding hollow glass articles such as beakers, tumblers, jars, bottles and the like.

Machines for forming hollow glass articles are known which comprise a rotating turret or table, a plurality of moulds situated around the periphery of the table, feeding means for feeding charges of molten glass into each mould as it moves beneath the feeding means, means, for example a reciprocating plunger or blowpipe, for forming the glass charge into shape in the mould, and means for ejecting or extracting the finally shaped article from the mould. The rotary motion of the table or turret is normally intermittent, so that each mould in turn is presented to the feeding means, the forming means and the ejecting means.

In certain machines of this type, particularly those wherein the forming means is a pressing member, the moulded glass article is extracted from the mould by means of a push rod, which passes through the lower part of the mould and lifts the article so that it may be gripped by a pair of gripping jaws which deposit it on a conveyor. In other machines of this type the formed article is lifted by means of a suction head.

It sometimes happens that the ejector or extractor, whether it be a push rod and gripper or a suction head, fails to operate, and it is therefore necessary for the formed article to be removed manually since otherwise the mould bearing it would receive a further charge of molten glass at the feeder station. This particular mould would then move to the forming station carrying both a completely formed article and a further charge of molten glass, and the subsequent forming operation involving this double charge will ruin either the mould or the forming means, or both. Thus, it has hitherto been necessary for machines of this type to be under constant surveillance, since in the event that a formed article is not removed at the removal station it is necessary, in order not to damage the machine, either to remove it by hand or to stop the machine.

It is the object of the present invention to provide an automatic machine for the production of glass articles which may operate without the need for constant surveillance.

According to the invention a machine for forming glass articles comprises a plurality of moulds, means for charging a mass of molten glass into each mould at a charging station, means for forming the mass into shape in each mould at a forming station, means for removing the formed article from each mould at a removal station, means for moving said moulds to and from said stations, and a control unit indexable intermittently into a plurality of positions equal to the number of moulds contained in the machine, the control unit comprising a plurality of memory means, one for each mould, a sensor situated between the removal station and the charging station and capable of determining the presence of a filled mould and of providing a signal upon sensing a filled mould, means responsive to the signal for operating one of the memory means corresponding to the filled mould, and means adapted, on engagement with the one memory means, to cause the charging means not to charge a mass of molten glass into the filled mould or to cause the forming means not to operate in conjunction with the filled mould.

Preferably the sensor is an infrared detector head which is situated vertically above the path of movement of the moulds and next to the removal station, and this works by virtue of its ability to detect the difference in temperature between an empty mould and a mould containing a newly formed hot glass article.

In a particular embodiment according to the invention the glassmaking machine is of the intermittently indexible rotating turret type, the moulds being mounted thereon and the turret being indexible so as to bring each mould successively into position at each of the three stations. Machines of this type, and the relevant drive mechanisms therefor, are well known.

A suitable control unit for such a machine is an intermittently rotatable circular plate which rotates in synchronism with the rotary turret; for example, the plate may be in the form of a toothed ratchet wheel which is indexed by the movement of a piston rod of a pneumatic cylinder, which cylinder is coupled in parallel with a pneumatic cylinder operating the removal of a formed glass article from a mould. Thus, as an article is removed from a mould in the main turret, the ratchet wheel is indexed one position.

The memory means are suitably pins mounted in the ratchet wheel so as to be movable between operative and nonoperative positions. The pins are preferably mounted equidistantly on a circular line, and suitably each is mounted opposite one of the teeth of the wheel. Furthermore, the pins are suitably mounted so that in their nonoperative position they extend from one side of the ratchet wheel, and in their operative position they extend from the other side. They are preferably caused to move from nonoperative position to operative position by contact with a lever attached to a solenoid which is coupled to the sensor and is energised on receipt of a signal therefrom. The lever contacts the pins and pushes them through the wheel so as to extend from the opposite side of the wheel from that from which they extend in normal, nonoperative position.

When thus placed in operative condition the pins are able, on further indexing of the wheel, to contact a microswitch which is coupled either to the mould charging mechanism or the article forming mechanism.

Thus, when the sensor senses a filled mold it passes a signal to the solenoid and energises it. The lever attached to the solenoid strikes the pin on the wheel corresponding to the mould in which the sensor has sensed hot glass, and pushes it into operative position. On indexing of the wheel, synchronously with the rotary turret carrying the filled mould, the pin in operative position actuates the switch which in turn causes either the mould charging mechanism or the article forming mechanism not to operate in conjunction with the filled mould. The mould can then be emptied manually and full operation of the machine recommenced. The pin is preferably returned to nonoperative position by an inclined plate which, on contact with the pin, gradually pushes it through the ratchet wheel as the latter is rotated.

Figure 5:
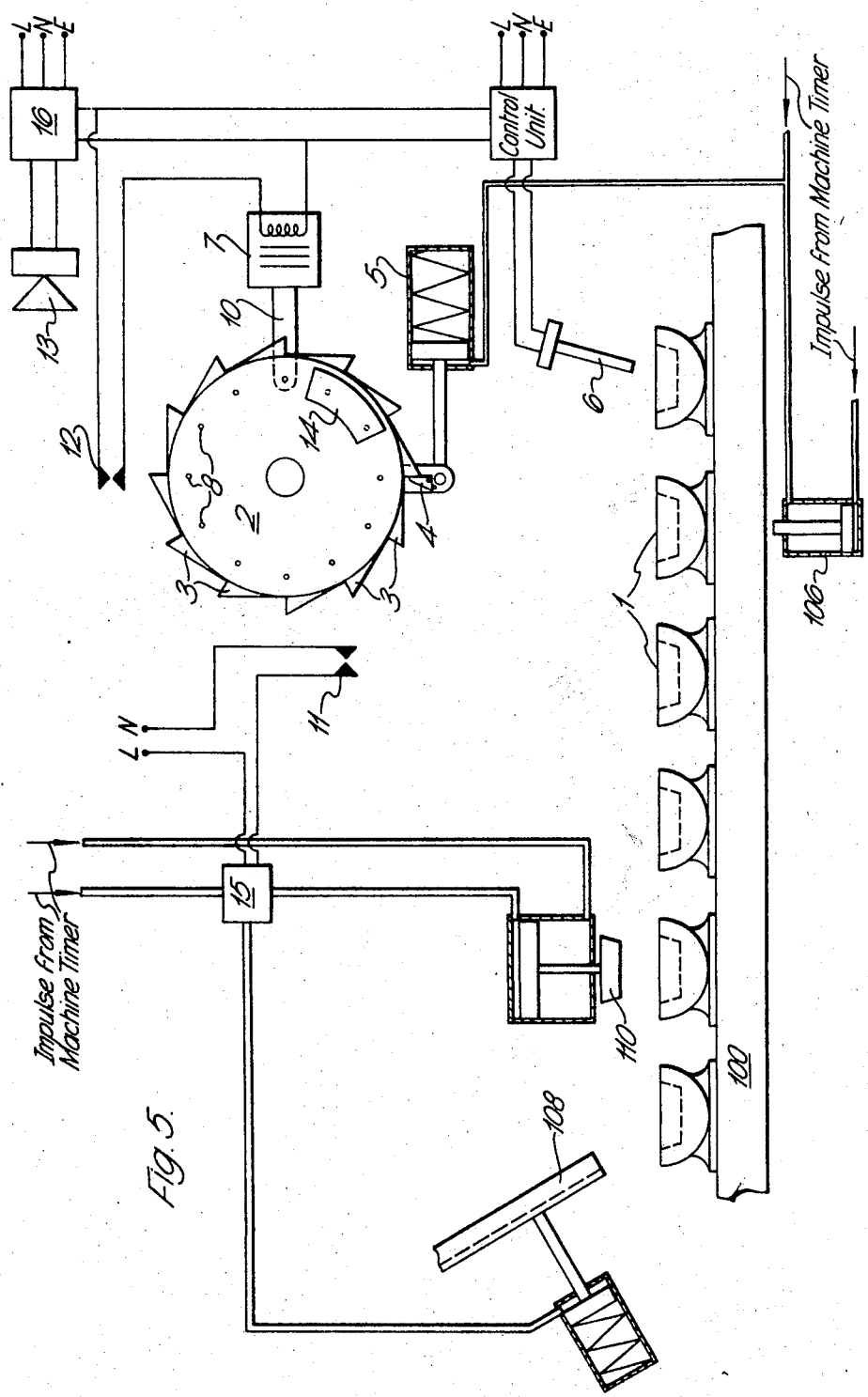

A glassmaking machine embodying the present invention will now be described with reference to the accompanying drawings, FIG. 1 of which shows in diagrammatic form the various components of the control unit. FIGS. 2 and 3 are sectional elevations of a portion of one of the components of the control unit. FIG. 4 is a diagrammatic plan view of the glassmaking machine, and FIG. 5 is a schematic elevational view showing the basic components of the glassmaking machine and the control unit, and the relationship therebetween.

The glassmaking machine comprises a rotating turret 100 on which are situated twelve press moulds, one of which is indicated at 1. The turret is intermittently rotatable by means of a drive box 102 and a Geneva cam and wheel indexing mechanism shown schematically at 104, and each mould thereon is successively presented to a number of working stations, i.e., a mould charging station, a pressing or blowing station, and a formed article removing station.

Coupled so that it operates in synchronism with the rotary turret is a twelve-toothed ratchet wheel 2, the ratchets or teeth being designated 3. This ratchet wheel is caused to rotate with the rotary turret 100 carrying the moulds by means of a pawl 4, attached to the piston rod of a pneumatic cylinder 5, which is coupled in parallel with a pneumatic cylinder 106 which operates a push rod associated with each mould to eject the formed glass article from the mould. Thus, every time the ware ejector cylinder 106 operates, pneumatic cylinder 5 operates and the ratchet wheel 2 is indexed in an anticlockwise direction. In other words, movement of one mould on the rotary table from one stationary position to the next is accompanied by movement of ratchet wheel 2 from one stationary position to the next. Mounted on the ratchet wheel are twelve pins, designated 8, one for each mould on the rotary turret. These pins are held in position on the ratchet wheel by means of an O-ring 9 (see FIG. 2). The pins normally project downwardly from the ratchet wheel.

When the ware ejector rod fails to eject a formed article from a mould, the mould, together with the hot glass article, passes beneath an infrared detector head 6 situated vertically above the mould immediately after the article removal station. The detector head senses the presence of a hot glass article, by virtue of the fact that the temperature of a formed article in the mould is higher than the temperature of the empty mould, and passes a signal to a solenoid 7.

Attached to solenoid 7 is a lever 10, and when the solenoid is energised upon reception of a signal from the sensor 6 the lever 10 is immediately raised. The raising of the lever pushes the particular pin 8 which is in the path of the lever at the time upwards to the position shown in FIG. 3. This pin is that corresponding to the mould which has not been emptied at the ejector station. As the rotary turret is indexed to its next position the lever 10, the solenoid 7 being deenergised, is lowered to its initial position, leaving the pin 8 protruding upwardly from the wheel 2. The pin thus acts as a memory means, and upon further indexing of the ratchet wheel 2 (and of course the rotary turret), the raised pin comes into a position corresponding to that at which glass is normally charged into the mould or that at which the forming operation is normally performed. As raised pin 8 comes into this position it contacts a microswitch 11 which is coupled either to the charging means (charging chute 108) or the forming mechanism (cylinder-operated pressing plunger 110) to cause either of those two not to function. Thus, for example, if the forming operation is a press-forming operation, as indicated in FIG. 5, with the press tool 110 being operated by a solenoid-operated spool valve 15, the microswitch 11 may be connected so as to throw the spool valve to the "no-press" position, thus preventing descent of the press tool.

In order to ensure that the rotary indexing of the ratchet wheel does not foul lever 10 in its raised position, a switch 12 is inserted in series with solenoid 7. The circuit is only completed through this switch when the ratchet wheel has reached the end of its indexing motion, thus ensuring that the solenoid can only operate when the ratchet wheel is stationary.

It is preferable that the sensing of a filled mould not only actuates the safety mechanism but also causes an audible signal to be sounded. For this purpose, the signal which energises solenoid 7 is also used to energise a hold on contactor 16. This contactor, when thus energised, actuates a warning device, e.g. siren 13, and must be manually reset.

After contacting the microswitch 11 the raised pin 8 remains raised for a further four indexing positions, when it comes into contact with an inclined plate 14, which pushes it back to its initial position. Of course, if the offending article has not been removed from the mould the pin will again be raised by the lever 10 coupled to the solenoid 7, and the operation described above will once again take place. However, it is envisaged that as soon as the siren is heard attention will be given to the machine to ensure that, either manually or mechanically, the offending article is removed.

What we claim is:

1. A machine for forming glass articles comprising a plurality of moulds, means for charging a mass of molten glass into each mould at a charging station, means for forming the mass into shape in each mould at a forming station, means for removing the formed articles from each mould at a removal station, means for moving said moulds to and from said stations, and a control unit indexable intermittently into a plurality of positions equal to the number of moulds contained in the machine, the control unit comprising a plurality of memory means, one for each mould, an infrared detector head situated vertically above the path of movement of the moulds and between the removal station and the charging station for determining the presence of a filled mould and for providing a signal upon sensing a filled mould, means responsive to the signal for operating one of the memory means corresponding to the filled mould, and means for engaging the one memory means to cause the charging means not to charge a mass of molten glass into the filled mould or to cause the forming means to operate in conjunction with the filled mould.

2. A machine as claimed in claim 1 wherein each memory means comprises a pin movable between an operative position and a nonoperative position.

3. A machine as claimed in claim 2 wherein the pins are mounted equidistantly in a circular intermittently rotatable plate.

4. A machine as claimed in claim 3 wherein said plate is a toothed ratchet wheel and said moulds are mounted on an intermittently rotatable turret, an indexing movement of the ratchet wheel being simultaneous with an operation at one of said stations.

5. A machine as claimed in claim 4 wherein an indexing movement of the ratchet wheel is simultaneous with the operation of the formed article removal means at the removal station.

6. A machine as claimed in claim 5 wherein a pneumatic cylinder operating said ratchet wheel is coupled in parallel with a pneumatic cylinder operating said removal means.

7. A machine as claimed in claim 1 wherein the pins are movable from their nonoperative position to their operative position by means of a lever attached to a solenoid which is energised on receiving said signal from said sensor.

8. A machine as claimed in claim 1 wherein each pin, when in operative position, contacts a microswitch coupled either to the charging means or the forming means.

9. A machine as claimed in claim 1 wherein the pins are returnable from their operative position to their nonoperative position by contact with an inclined plate.

10. A machine as claimed in claim 1 wherein said signal includes an audible signal.

References Cited
UNITED STATES PATENTS
3,418,096  12/1968  Bathellier _____ 65—158X S. LEON BASHORE, Primary Examiner S. R. FRIEDMAN, Assistant Examiner U.S. Cl. X.R.
65—159, 160, 164